(12) United States Patent
Breitkopf et al.

(10) Patent No.: US 10,364,365 B2
(45) Date of Patent: Jul. 30, 2019

(54) CURABLE COLORED INKS FOR MAKING COLORED SILICONE HYDROGEL LENSES

(71) Applicant: Novartis AG, Basel (CH)

(72) Inventors: Richard Charles Breitkopf, Dunwoody, GA (US); Ellen A. Day, Alpharetta, GA (US); Yongxing Qiu, Suwanee, GA (US); Ritu Shrestha, Pasadena, CA (US)

(73) Assignee: Novartis AG, Basel (CH)

( * ) Notice: Subject to any disclaimer, the term of this patent is extended or adjusted under 35 U.S.C. 154(b) by 281 days.

(21) Appl. No.: 15/348,346

(22) Filed: Nov. 10, 2016

(65) Prior Publication Data

US 2017/0183520 A1    Jun. 29, 2017

Related U.S. Application Data

(60) Provisional application No. 62/271,374, filed on Dec. 28, 2015.

(51) Int. Cl.
| | |
|---|---|
| *C09D 11/107* | (2014.01) |
| *B29D 11/00* | (2006.01) |
| *C09D 11/03* | (2014.01) |
| *C09D 11/10* | (2014.01) |
| *C09D 11/101* | (2014.01) |
| *G02C 7/04* | (2006.01) |
| *C09D 11/033* | (2014.01) |
| *C09D 11/037* | (2014.01) |

(52) U.S. Cl.
CPC ...... *C09D 11/107* (2013.01); *B29D 11/00923* (2013.01); *C09D 11/03* (2013.01); *C09D 11/033* (2013.01); *C09D 11/037* (2013.01); *C09D 11/10* (2013.01); *C09D 11/101* (2013.01); *G02C 7/046* (2013.01); *G02C 7/049* (2013.01); *B29D 11/00038* (2013.01)

(58) Field of Classification Search
CPC ..... C09D 11/107; C09D 11/03; C09D 11/033; C09D 11/037; C09D 11/10; C09D 11/101; B29D 11/00923; B29D 11/00038; G02C 7/046; G02C 7/049
USPC .......................................................... 524/88
See application file for complete search history.

(56) References Cited

U.S. PATENT DOCUMENTS

| | | |
|---|---|---|
| 3,536,386 A | 10/1970 | Spivack |
| 4,536,554 A | 8/1985 | Repella |
| 4,582,402 A | 4/1986 | Knapp |
| 4,668,240 A | 5/1987 | Loshaek |
| 4,704,017 A | 11/1987 | Knapp |
| 4,857,072 A | 8/1989 | Loshaek |
| 4,983,702 A | 1/1991 | Mueller |
| 5,034,166 A | 7/1991 | Bao |
| 5,087,392 A | 2/1992 | Burke |
| 5,272,010 A | 12/1993 | Quinn |
| 5,656,210 A | 8/1997 | Sendijarevic |
| 5,760,100 A | 6/1998 | Terry |
| 6,955,832 B2 | 10/2005 | Corti |
| 8,721,782 B1 | 5/2014 | Thomas |
| 8,758,494 B2 | 6/2014 | Mayo |
| 9,062,226 B2 | 6/2015 | Mayo |
| 2001/0050753 A1 | 12/2001 | Tucker |
| 2003/0119943 A1 | 6/2003 | Corti |
| 2003/0184710 A1 | 10/2003 | Tucker |
| 2005/0218536 A1 | 10/2005 | Carlson |

FOREIGN PATENT DOCUMENTS

| | | | | |
|---|---|---|---|---|
| CN | 104861846 A | * | 8/2015 | |
| WO | 2002/074186 A1 | | 9/2002 | |
| WO | WO-02074186 A2 | * | 9/2002 | ............. G02B 1/043 |
| WO | 2013/101481 A1 | | 4/2013 | |
| WO | WO-2013101481 A1 | * | 7/2013 | ....... B29D 11/00038 |

OTHER PUBLICATIONS

Huang et al. (CN 104861846A)—machine translation. (Year: 2015).*

* cited by examiner

*Primary Examiner* — Ronald Grinsted
(74) *Attorney, Agent, or Firm* — Sheng-Hsin Hu

(57) ABSTRACT

The present invention provides an actinically or thermally curable ink for making colored silicone hydrogel contact lenses. The ink of the invention comprises at least a pigment, a polymeric dispersant, a solvent and an actinically or thermally curable silicone-containing binder polymer including ethylenically unsaturated groups and segments derived from at least one silicone-containing vinylic monomer or macromere. The ink of the invention is characterized by having capability to be cured actinically or thermally to form a colored coat on a silicone hydrogel contact lens, wherein the ink is characterized by having an longer print life using a pad-printing system by at least 30% comparing to the ink which has the same composition except of no polymeric dispersant, wherein ink life is a number of printed parts that can be achieved in a print cycle.

14 Claims, No Drawings

CURABLE COLORED INKS FOR MAKING COLORED SILICONE HYDROGEL LENSES

This application claims the benefit under 35 U.S.C. § 119 (e) of U.S. provisional Application No. 62/272,374 filed Dec. 28, 2015, the content of which are incorporated by reference in its entirety.

The present invention is related to silicone-based inks for making colored silicone hydrogel contact lenses. The present invention is also related to a method for making colored hydrogel contact lenses.

BACKGROUND OF THE INVENTION

For cosmetic purposes, contact lenses having one or more colorants dispersed in the lens or printed on the lens are in high demand. These colored contact lenses enhance the natural beauty of the eye, or provide unique patterns on the iris of the wearer, or provide non cosmetic patterns or marks, such as rotation marks, inversion marks, product/brand codes, lot numbers, "DEMO" lenses, and the like, which are of benefits to wearers, eye-care practitioners and manufacturers. Various methods have been disclosed to make printing inks suitable for printing either hydrophilic (hydrogel) contact lenses or the molds that are then used to make hydrogel contact lenses.

U.S. Pat. No. 4,668,240 to Loshaek discloses colored contact lenses produced with a lens polymer that contains one or more of the functional groups —COOH, —OH, or —NH—R, wherein R is hydrogen or $C_1$ to $C_8$ alkyl. At least a portion of the surface of the lens is coated with a color coat comprising at least one pigment, binder polymer having the same functional groups, and an additional compound having at least two groups per molecule selected from at least one of —NCO and epoxy. The Loshaek patent discloses also that the lens polymer may contain one or more of the functional groups —NCO or epoxy whereas the binder polymer may contain one or more of the functional groups —COOH, —OH, or —NH—R. The lens and binding polymers are then bound to each other by the reaction of the groups —COOH, —OH, or —NH—R in the lens or the binder polymer and binding polymers with the groups —NCO or epoxy in the binder polymer or the lens.

U.S. Pat. No. 4,857,072 to Narducy, et al. discloses a method for making colored hydrophilic contact lenses. At least a portion of the surface of the lens is coated with a color coat comprising at least one pigment, binding polymer having functional groups, and an additional compound having at least two groups per molecule of —NCO. The coated lens is then subjected to conditions that cause the color coat to adhere to the lens.

U.S. Pat. No. 5,272,010 to Quinn discloses a method for preparation of colored contact lenses similar to that of U.S. Pat. Nos. 4,668,240 and 4,857,072 except that an isocyanate compound is not required. Instead, adhesion promoters such as hexamethoxymethylmelamine are used.

U.S. Pat. No. 6,955,832 to Quinn, et al. discloses a method for making colored hydrophilic contact lenses. At least a portion of a surface of a lens is coated with a color coat comprising at least one colorant, and a binder polymer having latent crosslinkable pendent groups (e.g., epoxy, hydroxy, alkenyl, isocyanate, peroxy, perester, anhydride, silane, and combinations thereof). The lens is then subjected to conditions that cause the color coat to adhere to the lens. In such method, inks are substantially free of a separate adhesion promoter species such as hexamethylene diisocyanate or hexamethoxymethylmelamine.

U.S. Pat. No. 6,955,832 discloses an actinically or thermally curable ink for making colored silicone hydrogel contact lenses. The ink comprises at least one colorant, a solvent and a binder polymer including ethylenically unsaturated groups and segments derived from at least one silicone-containing vinylic monomer or macromer.

However, the majority of inks described in the prior art are for non-silicone hydrogel lenses and would be undesirable for use with silicone hydrogels. In recent years, silicone hydrogel contact lenses, for example, Focus NIGHT & DAY™ (CIBA VISION), become more and more popular because of corneal health benefits provided by their high oxygen permeability and comfort. Inks described in the prior art have properties (e.g., surface energy, oxygen permeability, water content, expansion characteristics, etc.) which may not be compatible with silicone hydrogel lenses, since they are designed for conventional (non-silicone) hydrogels and not for silicone hydrogel lenses. They may have adverse effects to the properties of silicone-hydrogel lenses.

Therefore, there exist needs for methods of making colored silicone hydrogel contact lenses, and for inks suitable for printing a high-quality color image on a silicone hydrogel contact lens.

SUMMARY OF THE INVENTION

The inks of the present invention are suitable for producing a high-quality color image on a silicone hydrogel contact lens using a pad-printing system and have a longer print life.

In one aspect, the present invention provides an ink for making colored silicone hydrogel contact lenses, comprising at least a pigment, a polymeric dispersant, a solvent and an actinically or thermally curable silicone-containing binder polymer including ethylenically unsaturated groups and segments derived from at least one silicone-containing vinylic monomer or macromer, wherein the ink is substantially free of water and wherein the ink is characterized by having an longer print life using a pad-printing system by at least 30% compared to the ink which has the same composition except without polymeric dispersant.

In another aspect, the present invention provides a method for making a colored silicone hydrogel contact lens, comprising the steps of: (a) providing a contact lens constructed of a silicone hydrogel; (b) applying a color coat to at least a portion of a surface of the lens with an ink comprising at least a pigment, a polymeric dispersant, a solvent and an actinically or thermally curable binder polymer which comprises ethylenically unsaturated groups and segments derived from at least one silicone-containing vinylic monomer or macromer; and (c) curing the ink, thereby causing the color coat to adhere to the lens.

In a further aspect, the present invention comprises a method for making a colored silicone hydrogel contact lens, comprising the steps of: (a) applying a color coat to at least a portion of at least one of molding surfaces of a lens mold with an ink comprising at least a pigment, a polymeric dispersant, a solvent and an actinically or thermally curable binder polymer which comprises ethylenically unsaturated groups and segments derived from at least one silicone-containing vinylic monomer or macromer, wherein the mold has a lens-forming cavity between the molding surfaces, wherein the colored coat contains a first surface exposed to the interior of the lens-forming cavity and a second surface in contact with the molding surface; (b) dispensing a lens-forming material into the lens-forming cavity of the mold while maintaining substantially the color coat in position; (c) curing the lens-forming material within the lens-forming cavity to form the contact lens, whereby the colored coat detaches from the molding surface and becomes integral with the body of the contact lens.

DETAILED DESCRIPTION OF EMBODIMENTS OF THE INVENTION

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as common within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"Contact Lens" refers to a structure that can be placed on or within a wearer's eye. A contact lens can correct, improve, or alter a users eyesight, but that need not be the case. A contact lens can be of any appropriate material known in the art or later developed, and can be a soft lens, a hard lens, or a hybrid lens. A contact lens can be in a dry state or a wet state. "Dry State" refers to a soft lens in a state prior to hydration or the state of a hard lens under storage or use conditions. "Wet State" refers to a soft lens in a hydrated state.

The "front or anterior surface" of a contact lens, as used herein, refers to the surface of the lens that faces away from the eye during wear. The anterior surface, which is typically substantially convex, may also be referred to as the front curve of the lens.

The "rear or posterior surface" of a contact lens, as used herein, refers to the surface of the lens that faces towards the eye during wear. The rear surface, which is typically substantially concave, may also be referred to as the base curve of the lens.

A "colored contact lens" refers to a contact lens (hard or soft) having a color image printed thereon. A color image can be a cosmetic pattern, for example, iris-like patterns, Wild Eye™ patterns, made-to-order (MTO) patterns, and the like; an inversion mark that allows a user to handle and insert easily a contact lens; or contact lenses stock keeping units (SKUs), for example, either in forms of numbers or as bar codes. A color image can be a single color image or a multi-color image. A color image is preferably a digital image, but it can also be an analog image.

A colored contact lens can be produced by printing a high-quality color image directly on a contact lens using methods and systems of the invention. A contact lens can be clear before it is printed upon. Alternatively, a contact lens can be tinted prior to being printed upon. That is, a colorant may have been added to that lens using methods that are well known in the art before that lens is printed upon using a printing method of the invention.

A "pigment" means a powdered substance that is suspended in a liquid in which it is insoluble. Pigments are used to impart color. Pigments, in general, are more opaque than dyes. While any suitable pigment may be employed, it is presently preferred that the pigment is heat resistant, non-toxic and insoluble in aqueous solutions. Examples of preferred pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine (PCN) green, phthalocyanine (PCN) blue, titanium dioxides, etc. See Marmiom DM Handbook of U.S. Colorants for a list of colorants that may be used with the present invention. A more preferred embodiment of a non-pearlescent pigment include (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various iron oxides; PR122, PY154, for violet, carbazole violet; for black, Monolith black C-K (CIBA Specialty Chemicals).

Organic pigments are based on carbon chains and aromatic rings. However, they can also contain metallic (inorganic) elements that help stabilize the properties of the organic component, and create the desired optical properties bringing about the desired color. Examples of useful organic pigments include, without limitation, azo pigments, copper phthalocyanine blue, copper phthalocyanine green (chlorinated ring), carbazole violet, vat orange #1, and the like and combinations thereof.

Inorganic pigments, chemical compounds not based on carbon, are usually metallic salts precipitated from solutions. Examples of useful inorganic pigments include, without limitation, iron oxide black, iron oxide brown, iron oxide yellow, iron oxide red, titanium dioxide, cobalt aluminum chromium oxide, chromium oxide, and the like, and combinations thereof.

"Stable" in reference to an ink, as used herein, means that no liquid phase separation and/or pigment precipitation and/or increase of viscosity occurs over a specific time period. A stable ink can provide more flexibility in producing colored ophthalmic lenses.

As used herein, the term "good adhesion to a medical device" in reference to an ink means that a color image printed with the ink on a contact lens can pass at least a finger rubbing test, preferably pass the finger rubbing test and a sterilization-surviving test.

"A binder polymer" refers to a crosslinkable polymer that can be crosslinked by a crosslinker or upon initiation by a chemical or physical means (e.g., moisture, heating, UV irradiation or the like) to trap or bind colorants onto or into a medical device (preferably a contact lens) such as that term is known in the art.

The term "olefinically unsaturated group" is employed herein in a broad sense and is intended to encompass any groups containing at least one $>C=C<$ group. Exemplary ethylenically unsaturated groups include without limitation acryloyl, methacryloyl, allyl, vinyl, styrenyl, or other C=C containing groups.

A "hydrogel" refers to a polymeric material which can absorb at least 10 percent by weight of water when it is fully hydrated. Generally, a hydrogel material is obtained by polymerization or copolymerization of at least one hydrophilic monomer in the presence of or in the absence of additional monomers and/or macromers.

A "silicone hydrogel" refers to a hydrogel obtained by copolymerization of a polymerizable composition comprising at least one silicone-containing vinylic monomer or at least one silicone-containing macromer.

"Hydrophilic," as used herein, describes a material or portion thereof that will more readily associate with water than with lipids.

A "lens-forming material" refers to a polymerizable composition which can be cured (i.e., polymerized and/or crosslinked) thermally or actinically to obtain a crosslinked polymer. As used herein, "actinically" in reference to curing or polymerizing of a polymerizable composition or material or a lens-forming material means that the curing (e.g., crosslinked and/or polymerized) is performed by actinic irradiation, such as, for example, UV irradiation, ionized radiation (e.g. gamma ray or X-ray irradiation), microwave irradiation, and the like. Thermal curing or actinic curing methods are well-known to a person skilled in the art. Lens-forming materials are well known to a person skilled in the art.

A "prepolymer" refers to a starting polymer which can be cured (e.g., crosslinked and/or polymerized) actinically or thermally or chemically to obtain a crosslinked and/or polymerized polymer having a molecular weight much higher than the starting polymer. A "crosslinkable prepolymer" refers to a starting polymer which can be crosslinked upon actinic radiation to obtain a crosslinked polymer having a molecular weight much higher than the starting polymer.

A "monomer" means a low molecular weight compound that can be polymerized. Low molecular weight typically means average molecular weights less than 700 Daltons.

A "vinylic monomer", as used herein, refers to a low molecular weight compound that has an ethylenically unsaturated group and can be polymerized actinically or thermally. Low molecular weight typically means average molecular weights less than 700 Daltons.

A "hydrophilic vinylic monomer", as used herein, refers to a vinylic monomer which as a homopolymer typically yields a polymer that is water-soluble or can absorb at least 10 percent by weight water.

A "hydrophobic vinylic monomer", as used herein, refers to a vinylic monomer which as a homopolymer typically yields a polymer that is insoluble in water and can absorb less than 10 percent by weight water.

A "macromer" refers to a medium to high molecular weight compound or polymer that contains functional groups capable of undergoing further polymerizing/crosslinking reactions. Medium and high molecular weight typically means average molecular weights greater than 700 Daltons. Preferably, a macromer contains ethylenically unsaturated groups and can be polymerized actinically or thermally.

A "polymer" means a material formed by polymerizing/crosslinking one or more monomers, macromers and or oligomers.

As used herein, "actinically" in reference to curing or polymerizing of a polymerizable composition or material means that the curing (e.g., crosslinked and/or polymerized) is performed by actinic irradiation, such as, for example, UV irradiation, ionized radiation (e.g. gamma ray or X-ray irradiation), and microwave irradiation.

A "photoinitiator" refers to a chemical that initiates radical crosslinking/polymerizing reaction by the use of light. Suitable photoinitiators include, without limitation, benzoin methyl ether, diethoxyacetophenone, a benzoylphosphine oxide, 1-hydroxycyclohexyl phenyl ketone, Darocure® types, and Irgacure® types, preferably Darocure® 1173, and Irgacure® 2959.

A "thermal initiator" refers to a chemical that initiates radical crosslinking/polymerizing reaction by the use of heat energy. Examples of suitable thermal initiators include, but are not limited to, 2,2'-azobis (2,4-dimethylpentanenitrile), 2,2'-azobis (2-methylpropanenitrile), 2,2'-azobis (2-methylbutanenitrile), peroxides such as benzoyl peroxide, and the like. Preferably, the thermal initiator is 2,2'-azobis(isobutyronitrile) (AIBN).

An "interpenetrating polymer network (IPN)" as used herein refers broadly to an intimate network of two or more polymers at least one of which is either synthesized and/or crosslinked in the presence of the other(s). Techniques for preparing IPN are known to one skilled in the art. For a general procedure, see U.S. Pat. Nos. 4,536,554, 4,983,702, 5,087,392, and 5,656,210, the contents of which are all incorporated herein by reference. The polymerization is generally carried out at temperatures ranging from about room temperature to about 145° C.

In one aspect, the present invention provides an ink for making colored silicone hydrogel contact lenses, comprising at least a pigment, a polymeric dispersant, a solvent and an actinically or thermally curable silicone-containing binder polymer including ethylenically unsaturated groups and segments derived from at least one silicone-containing vinylic monomer or macromer, wherein the ink is substantially free of water and wherein the ink is characterized by having an longer print life using a pad-printing system by at least 30% comparing to the ink which has the same composition except without polymeric dispersant.

The ink of the invention is actinically or thermally curable to form a colored coat on a contact lens or a molding surface of a mold.

A solvent can be an organic or inorganic solvent, a mixture of several organic solvents, Any known suitable solvents can be used, so long as they can dissolve the binder in the ink of the invention and aid in the stability of the colorant. Exemplary solvents include, without limitation, acetone, alcohols (e.g., methanol, ethanol, propanol, isopropanol, 2-ethyoxyethanol, etc.), glycols, ketones, esters, cyclopentanone, cyclohexanone, tetrahydrofuran, acetone, methyl-2-pyrrolidone, dimethyl formamide, acetophenone, methylene dichloride, dimethyl sulfoxide, gamma-butyrolactone, ethylene dichloride, isophorone, o-dichlorobenzene, tetrahydrofuran, diacetone alcohol, methyl ethyl ketone, acetone, 2-nitropropane, ethylene glycol monoethyl ether, propylene carbonate, cyclohexanol, chloroform, trichloroethylene, 1,4-dioxane, ethyl acetate, ethyl lactate, ethylene glycol monobutyl ether, chlorobenzene, nitroethane, ethylene glycol monomethyl ether, butyl acetate, 1-butanol, methyl isobutyl ketone, nitromethane, toluene, ethanol, diethylene glycol, benzene, diethyl ether, ethanolamine, carbon tetrachloride, propylene glycol, hexane, ethylene glycol, and formamide. According to the present invention, the solvent is preferred substantially free of water. Here, substantially free of water refer to less than 5%, more preferably less than 2%, even more preferably less than 1% of water.

Pigment(s) are preferably about 5 microns or smaller in size. Larger particles of a pigment can be ground into smaller particles. Any number of methods known in the art can be used to grind pigment. Exemplary preferred methods of reducing a pigment's particle size include high speed mixers, Kady Mills (rotor stator dispersion device), colloid mills, homogenizers, microfluidizers, sonalators, ultrasonic mills, roll mills, ball mills, roller mills, vibrating ball mills, attritors, sand mills, varikinetic dispensers, three-roll mills, Banbury mixers, or other methods well known to those of skill in the art. Particle size distribution, shape and orientation strongly influence final appearance.

An actinically or thermally curable binder polymer of the invention includes ethylenically unsaturated groups and segments derived from at least one silicone-containing vinylic monomer or macromer. Preferably, the actinically or thermally curable binder polymer of the invention further includes hydrophilic segments derived from at least one hydrophilic vinylic monomer.

In accordance with the present invention, the actinically or thermally curable binder polymer of the invention is an ethylenically functionalized derivative of a silicon-containing polymer having pendant functional groups, preferably selected from the group consisting of hydroxyl groups (—OH), primary amino groups (—NH$_2$), secondary amino groups (—NHR), carboxylic groups (—COOH), epoxy groups, aldehyde groups (—CHO), amide groups (—CONH$_2$), acid halide groups (—COX, X=Cl, Br, or I), isothiocyanate groups, isocyanate groups, halide groups (—X, X=Cl, Br, or I), acid anhydride groups, and combinations thereof.

The term "ethylenically functionalized" as used herein is intended to describe the introduction of ethylenically unsaturated groups into the silicone-containing polymer with pendant functional groups.

The silicone-containing polymer is preferably a copolymerization product of a polymerizable composition, which comprises (a) at least one hydrophilic vinylic monomer, (b) at least one functionalizing vinylic monomer containing at least one functional group, and (c) at least one silicone-containing vinylic monomer or macromer. The polymerizable composition can also include a polymerization initiator (i.e., a photoinitiator or a thermal initiator), a solvent which is preferably the solvent used in an ink, and a chain transfer agent.

Any know suitable siloxane-containing macromer can be used to prepare soft contact lenses. A particularly preferred siloxane-containing macromer is selected from the group consisting of Macromer A, Macromer B, Macromer C, and Macromer D described in U.S. Pat. No. 5,760,100, herein incorporated by reference in its entirety.

Nearly any hydrophilic vinylic monomer can be used in the fluid composition of the invention. Suitable hydrophilic monomers are, without this being an exhaustive list, hydroxyl-substituted lower alkyl (C$_1$ to C$_8$) acrylates and methacrylates, acrylamide, methacrylamide, (lower allyl) acrylamides and -methacrylamides, ethoxylated acrylates and methacrylates, hydroxyl-substituted (lower alkyl)acrylamides and -methacrylamides, hydroxyl-substituted lower alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazoline, 2-vinyl4,4'-dialkyloxazolin-5-one, 2- and 4-vinylpyridine, vinylically unsaturated carboxylic acids having a total of 3 to 5 carbon atoms, amino(lower alkyl)- (where the term "amino" also includes quaternary ammonium), mono(lower alkylamino)(lower alkyl) and di(lower alkylamino)(lower alkyl)acrylates and methacrylates, allyl alcohol and the like.

Among the preferred hydrophilic vinylic monomers are N,N-dimethylacrylamide (DMA), 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, dimethylaminoethyl methacrylate (DMAEMA), glycerol methacrylate (GMA), N-vinyl-2-pyrrolidone (NVP), dimethylaminoethylmethacrylamide, acrylamide, methacrylamide, allyl alcohol, vinylpyridine, N-(1,1dimethyl-3-oxobutyl)acrylamide, acrylic acid, and methacrylic acid.

Any know suitable vinylic monomer containing at least one functional group can be used as functionalizing vinylic monomer in the present invention. Preferred examples of such vinylic monomers includes methacrylic acid (MAA), acrylic acid, glycidylmethacrylate, glycidylacrylate, HEMA, HEA, methacrylic anhydride, N-hydroxymethylacrylamide (NHMA), 2-bromoethylmethacrylate, and vinylbenzylchoride.

It should be understood that a vinylic monomer can be used both as a hydrophilic vinylic monomer and as a functionalizing vinylic monomer in the polymerizable composition for preparing the silicone-containing polymer with pendant functional groups. Preferably, the hydrophilic vinylic monomer is devoid of functional groups (e.g., DMA, NVP).

Any known suitable chain transfer agent can be used in the present invention. Examples of preferred chain transfer agent includes mercaptoethane, mercaptoethanol, ethanedithiol, propanedithiol, and mercapto-terminated polydimethylsiloxane.

In accordance with the present invention, the ethylenically functionalized derivative of a silicon-containing polymer having pendant functional groups is a reaction product of the silicon-containing polymer with an ethylenically functionalizing agent which comprises an ethylencially unsaturated group and a group capable of reacting with the functional groups of the silicone-containing polymer to form covalent linkages. It is well known in the art that a pair of matching functional groups can form a covalent bond or linkage under known reaction conditions, such as, oxidation-reduction conditions, dehydration condensation conditions, addition conditions, substitution (or displacement) conditions, 2+2 cyclo-addition conditions, Diels-Alder reaction conditions, ROMP (Ring Opening Metathesis Polymerization) conditions, vulcanization conditions, cationic cross-linking conditions, and epoxy hardening conditions. For example, a hydroxyl, amino (primary or secondary) or acid group is covalently bondable with isocyanate group; an amino group is covalently bondable with aldehyde (Schiff base which is formed from aldehyde group and amino group may further be reduced); and a hydroxyl or amino group is covalently bondable with carboxyl group.

Examples of preferred ethylenically functionalizing agents include, but are not limited to, glycidylmethacrylate, glycidylacrylate, 2-isocyanatoethylmethacrylate (IEM), N-hydroxymethylacrylamide (NHMA), acryloylchloride, methacrylolylchloride, methacrylic acid, acrylic acid, 2-bromoethylmethacrylate, and methacrylic anhydride.

Preferred actinically or thermally curable binder polymer is a copolymerization product of a polymerizable mixture including (i) at least one hydrophilic vinylic monomer; (ii) at least one functionalizing vinylic monomer containing at least one functional group selected from the group consisting of hydroxyl group —OH, amino group —NHR (wherein R is hydrogen or $C_1$ to $C_8$ alkyl), carboxylic group —COOH, epoxy group, amide group —CONHR, and combinations thereof; (iii) at least one silicone-containing vinylic monomer or macromere. Examples of actinically or thermally curable binder polymer are those disclosed in U.S. Pat. No. 8,147,728 (herein incorporated in its entirety). More preferred actinically or thermally curable binder polymers are prepared by a two stage processes. In the first stage, a copolymerization reaction is initiated by heat in a polymerizable composition which includes a solvent (e.g, ethylacetate), a thermal initiator (e.g., AIBN), a chain transfer agent (e.g., mercaptoethanol), a hydrophilic vinylic monomer devoid of functional groups (e.g. DMA), a vinylic monomer having at least one functional groups (e.g. HEMA, MAA, or glycidylmethacrylate), an alkoxysilane monomer (e.g. TRIS), and monomethacrylated polydimethylsiloxane. It is understood that the copolymerization can be initiated with either heat or UV light. In the second stage of the process, the silicone-containing polymer is converted to an actinically or thermally curable binder polymer. Examples of actinically or thermally curable binder polymer are those disclosed in U.S. Pat. No. 7,550,519 (herein incorporated in its entirety).

The ink of the invention can further comprise polymerizable components such as DMA, TRIS, and PDMS-MA (monomethacryloxypropyl-terminated polydimethylsiloxane) in order to enhance its compatibility with silicone hydrogels.

The ink of the invention can also be cured with the aide of a thermal initiator or preferably a photoinitiator. Any suitable photoinitiators can be used in the ink formulations. Examples of photoinitiators include but are not limited to Irgacure 2959, Irgacure 907, Irgacure 500, Irgacure 651, Irgacure 369, Daracure 1173, and Daracure 4265. In addition, combinations of initiators can be used. Pigments in ink formulations can block or reduce the amount of UV light that reaches actinically curable groups in ink formulations thereby reducing cure speed. Photo-initiators that have a broad UV absorption spectrum can be used to help alleviate such problems. For example Irgacure 907 and Irgacure 369 have strong UV absorption in longer UV regions and are effective in curing dark inks. Irgacure and Darcure initiators are available from CIBA specialty chemicals. Additional initiators include VAZO-52, VAZO-64, VAZO-67, and VAZO 88. Photosensitizers can also be added to an ink to facilitate actinically curing of the ink.

The present invention is partly based on the discovery that in a silicone-based inks for making colored silicone hydrogel contact lenses of the invention, a polymeric dispersant can improve the print ink life. Print ink life refers to the number of stacks past the dry cycle that can be printed for a single ink change. For example, if one stack is 5100 molds, or 2550 per the system counter, dry cycle (DC) refers to the number of print cycles required to bring the pattern intensity to an acceptable (bright enough) level. This is usually defined by number of cycles, which is number of molds printed per system counter/2. Typical dry cycle values are 200-1000. Without limiting this invention to any particular mechanism or theory, it is believed during pad transfer printing, the cliche/cup block will heat up due to friction. The ink thickening is very rapid and therefore print intensities change rapidly over the course of a processing cycle. It is believed that a polymeric dispersant reduces metal-on-metal or pigment abrasion-based friction. Rapid Ink thickening due to heat and friction is responsible for short ink life because print intensities get too "dark" too soon. A polymeric dispersant when incorporated will control particle agglomeration and reduce friction at the cup blade-cliche interface, which reduces heat evolved and ink thickening, creates a more uniform print intensity over time.

A dispersant generally creates an interface layer that can render the particle and the medium (solvent and/or monomer/polymer) compatible to prevent the particles from agglomerating. Dispersants generally contain at least two different kinds of groups, one which associates with one component and one which provides repulsion between particles.

According to the present invention, any suitable dispersants can be used, examples of suitable dispersants comprise at least one member selected from the group consisting of a polyvinylpyrrolidone, a phosphoric acid polyester copolymer, polycaprolactone-polyacid copolymers, a trimethoxysilane compound, a triethoxysilanes compound and a combination thereof. Suitable dispersants also include monomeric dispersants with pigment affinity groups such as amines or phosphates, for example, dimethylamino ethyl methacrylate (DMAEMA). The prefer polymeric dispersant are the polymeric dispersant is selected from a group consisting of polyvinylpyrrolidone, alkylamino-functionalized polyethylene oxide and polypropylene oxides, polyoxyethylene alkylether polymers with a phosphate ester functionality, Polyacrylic acid (PAA), vinyl monomer containing dialkylamine groups, and vinyl monomer containing phosphate ester group. The more preferred polymeric dispersant is a polyvinylpyrrolidone and the polyvinylpyrrolidone has a weight average of molecular weight of from 4000 to 20000.

The present invention is also partly based on the discovery that in a silicone-based inks for making colored silicone hydrogel contact lenses of the invention, a combination of a pigment synergist and a pigment dispersant can increase an amount of pigment in the ink. In the pigment grinding process, a combination of a pigment synergist and a pigment dispersant allows increase the content of pigment in the grinder while maintain the viscosity. Pigment concentrates in the ink base may be stabilized by synergists and dispersants. A pigment synergist is a substance that aims in improving pigment dispersion and stability. Typically, a pigment synergist strengthens the attachment of dispersants to the pigment surface and helps to stabilize the pigment particles within the ink base The pigment mentioned here can be a mixture of any kind of pigments. When higher pigment concentrations is used, pigment grinding process becomes difficult because highly pigmented inks require more concentrated grinds, which tend to be too viscous to handle and suffer from insufficient particle size reduction during the pigment grinding process. The grinding process becomes even more difficulty if the pigments consist essentially of organic pigments. Therefore, if a desire color requires a mixture of inorganic pigments and organic pigments, it is advantage to grinding organic pigments and inorganic pigments separately and then mixes them together later.

According to the present invention, the pigment comprises at least 2.5 percent, preferably 3.0 percent, more preferably 3.5 percent, even more preferably 4.0 percent of organic pigment selected from a group consisting of phthalocyanine blue, phthalocyanine green, carbazole violet and combinations thereof. This organic pigment is grinding with assistance of synergists in addition of solvent and dispersant.

According to the present invention, while any suitable synergists can be employed, examples of suitable synergists comprise at least one member selected from the group consisting of a sulfonated copper phthalocyanine, titanium dioxide, and silicon dioxides. Solsperse 12000 (copper phthalocyaninesulfonic acid) available from Lubrizol, is an example of pigment synergist, which is a polymeric material.

The dispersant in the pigment concentrate (or grind) may be present in an amount of from about 2 percent weight to about 40 percent weight, from about 5 percent weight to about 35 percent weight, or from about 10 percent weight to about 30 percent weight based on the total weight of the pigment grind.

According to the present application, the synergist is preferably added in a smaller amount than the polymeric dispersant(s). The ratio of polymeric dispersant/dispersion synergist depends upon the pigment and should be determined experimentally. Typically the ratio wt % polymeric dispersant/wt % dispersion synergist is selected between 2:1 to 100:1, preferably between 2:1 and 20:1.

The ink of the invention can further comprise one or more components selected from the group consisting of surfactant, humectant, antimicrobial agents, antioxidant agents, anti-coagulating agents, and other additives known in the art.

Although the inks disclosed here are designed for use with silicone hydrogel lenses, they could be used with non-silicone hydrogels of appropriate composition (e.g. low water content formulations).

This invention is also directed to methods for making colored silicone hydrogel contact lenses.

In another aspect, the present invention provides a method for making a colored silicone hydrogel contact lens, comprising the steps of: (a) providing a contact lens constructed of a silicone hydrogel; (b) applying a color coat to at least a portion of a surface of the lens with an ink comprising at least one colorant and an actinically or thermally curable binder polymer which comprises ethylenically unsaturated groups and segments derived from at least one silicone-containing vinylic monomer or macromer; and (c) curing the ink, thereby causing the color coat to adhere to the lens.

In a further aspect, the present invention comprises a method for making a colored silicone hydrogel contact lens, comprising the steps of: (a) applying a color coat to at least a portion of at least one of molding surfaces of a lens mold with an ink comprising at least one colorant and an actinically or thermally curable binder polymer which comprises ethylenically unsaturated groups and segments derived from at least one silicone-containing vinylic monomer or macromer, wherein the mold has a lens-forming cavity between the molding surfaces, wherein the colored coat contains a first surface exposed to the interior of the lens-forming cavity and a second surface in contact with the molding surface; (b) dispensing a lens-forming material into the lens-forming cavity of the mold while maintaining substantially the color coat in position; (c) curing the lens-forming material within the lens-forming cavity to form the contact lens, whereby the colored coat detaches from the molding surface and becomes integral with the body of the colored contact lens.

Where an ink is applied first to a molding surface of a mold to form a colored coat on the molding surface, the ink can be cured prior to dispensing of a lens-forming material into the printed mold. Alternatively, the ink can be cured simultaneously with the lens-forming material in the lens-forming cavity of the printed mold to form the colored contact lens. In the case of printing molds, the ink on the printed mold would be transferred to the lens after the lens-forming material is cured in the printed mold.

An ink can be applied to a contact lens or a molding surface of a mold according to any printing technologies, such as, for example, pad transfer printing (or pad printing), or inkjet printing. It is understood that other types of printing technologies could also be used to print lenses and or molds.

In pad-transfer printing, a color image is placed or printed on a pad transfer device and the image on the pad transfer device is transferred to another surface, such as a polymer or lens (U.S. Pat. No. 3,536,386 to Spivack; U.S. Pat. Nos. 4,582,402 and 4,704,017 to Knapp; U.S. Pat. No. 5,034,166 to Rawlings et al., herein incorporated by reference in their entireties). A typical example of this printing follows. An image is etched into metal to form a cliché. The cliché is placed in a printer. Once in the printer, the cliché is inked by either an open inkwell doctoring system or by a closed ink cup sliding across the image. Then, a silicone pad picks up the inked image from the cliché and transfers the image to the contact lens. The silicone pads are made of a material comprising silicone that can vary in elasticity. The properties of the silicone material permit the inks to stick to the pad temporarily and fully release from the pad when it contacts a contact lens or a mold. Appropriate pad-transfer printing structures include, but are not limited to, Tampo-type printing structures (Tampo vario 90/130), rubber stamps, thimbles, doctors blade, direct printing, or transfer printing as they are known in the art. Inks for pad printing operations will preferably have one or more of the following characteristics: viscosity lower than about 50,000 cps, preferably lower than about 5000 cps and most preferably below 1500 cps, particle size less than about 5 □m (for non-pearlescent pigment), surface tension from about 20 mN/m to about 60 mN/m; prolonged stability (i.e., stable for about 4 hours, preferably at least 8 hours, more preferably 24 hours, even more preferably at least 7 days, most preferably at least three weeks); an appropriate color level (visible by eye); good adhesion to medical devices; and good transfer from a mold to a medical device made in the mold. The physical stability of an ink could differ from its chemical stability. For example, pigments might settle from the ink (physical phenomenon) yet the ink may not have undergone any significant chemical reaction. For such situations the ink can be restored to a useable state by simply stirring or remixing. Other means of slowing or eliminating settling of pigment include but are not limited to use of additives, altering pH, in-line mixing, refrigeration, altering particle size of pigments, and coating pigment of pigment particles.

Printing a lens using an inkjet printing process is described in published US Patent Application Nos. 2001/0050753, 2001/0085934, 2003/0119943, and 2003/0184710, herein incorporated by references in their entireties.

In still a further aspect, the present invention provides a method of making a colored contact lens with an image embedded therein. This method comprises the steps of: (a) applying a color coat to at least a portion of at least one of molding surfaces of a lens mold with an ink comprising at least a pigment, a polymeric dispersant, a solvent and an actinically or thermally curable silicone-containing binder polymer, wherein the mold has a lens-forming cavity between the molding surfaces; (b) thermally or actinically curing the colored coat to form a colored film which is not covalently attached to any molding surfaces; (c) dispensing a lens-forming material into the lens-forming cavity of the mold; (d) letting the lens-forming material to soak the colored film for a period of time sufficient so that a portion of the lens-forming material penetrates into space between the colored film and the molding surface while detaching the colored film from the molding surface; (c) curing the lens-forming material within the lens-forming cavity to form the contact lens, whereby the colored film is embedded within the body of the contact lens between the anterior and posterior surfaces of the colored contact lens.

The colored film is soaked with the lens-forming material preferably for at least 5 minutes, more preferably for at least 10 minutes and even more preferably for at least 20 minutes.

In this aspect of the invention, any ink suitable for making colored contact lenses as long as it can be cured chemically, thermally or actinically (e.g., UV radiation) to form a colored film on the mold. An ink can comprise at least a pigment, a polymeric dispersant, a solvent and an actinically or thermally curable silicone-containing binder polymer, wherein the mold has a lens-forming cavity between the molding surfaces, and optionally a diluent. Preferably, the ink is an ink of the invention described above.

In accordance with the invention, a diluent can be a solvent or a solution of one or more vinylic monomers.

The ink can further comprise one or more components selected from the group consisting of a thermal initiator, a photoinitiator surfactant, humectant, antimicrobial agents, antioxidant agents, anti-coagulating agents, and other additives known in the art.

This invention has utility for production of colored silicone hydrogel contact lenses. Such lenses can be extended-wear contact lenses, daily-wear contact lenses, and/or ocular prosthetic devices.

Binder polymers of the invention can also find use as a lens-forming material in producing silicone hydrogel lenses for daily wear or extended wear modality. In addition, the binder polymers of the invention could also find use as intraocular lenses (IOL's), medical coatings (e.g. coatings for syringe needles, catheters), wound treatment, breathable paints, and breathable coatings. Improved breath ability in paints would likely decrease blistering and/or peeling due to moisture migrating out of wood or other surfaces.

The previous disclosure will enable one having ordinary skill in the art to practice the invention. In order to better enable the reader to understand specific embodiments and the advantages thereof, reference to the following examples is suggested. The percentages in the formulations are based on weight percentages unless otherwise specified.

EXAMPLE 1

Based on Two-stage UV Curing

This example describes synthesis of an actinically curable binder polymer

TABLE 1

| Components | Formulation (% by weight) |
| --- | --- |
| DMA | 38.53 |
| VAZO-52 | 0.60 |
| TRIS-methacrylate | 24.49 |
| Betacon macromer | 21.47 |
| HEMA | 10.10 |
| 2-mercaptoethanol | 1.38 |
| IEM | 3.43 |

IEM = 2-isocyanatoethylmethacrylate

Two-step binder synthesis is described as below:
Step 1—copolymerization
All reactants (minus IEM) area reacted together at 50° for 24 hours in ethyl acetate; 2-mercaptoethanol controls the viscosity build up.
4-hydroxy TEMPO is added at 100 ppm to scavenge any radicals created in the remaining synthetic process.
Step 2—Functionalization to Macromer
IEM and catalyst (dibutyltin dilaurate) are added to functionalize the copolymer; this reaction is at 40° for 4 hours.
Finishing
The product is solvent exchanged to 1-propanol by evaporating off ethyl acetate.
Macromer ("binder polymer") is then incorporated into ink formulation.

EXAMPLE 2

This example describes effect of dispersion on print life

| Components | Formulation (% by weight) | Formulation (% by weight) |
| --- | --- | --- |
| Binder from example 1 | 38 | 38 |
| Irgacure 4265 | 1.0 | 1.0 |
| Pigments (black)* | 5-10% | 5-10% |
| Dispersant** weight % on pigment | 0% | 5% |
| Solvent/1-propanol | Balance to 100% | Balance to 100% |
| Print life | 0.5 stack | 1-1.5 stacks |

*iron oxide
**(PVP, mw: 8000)

The printing occurs with a pad printing method wherein a silicone pad transfers a defined pattern from a metal or ceramic cliche. An ink cup contains the ink and a cup blade doctors the ink so that only ink remains in the cliche pattern, which is recessed a certain depth into the plate. Ink life is determined by the print cycle counter, which tracks how many prints have been made. The ink cup is about 90 mm tall, by about 1.5 cm diameter. This also means the cup blade speed will adjust accordingly when the rest of the printing process speeds up or slows down. Typically, the speed is 0.5 to 3 seconds (pad pickup of ink to completion of pad deposition on mold substrate).

EXAMPLE 3

This example describes effect of dispersant and synergist on pigment loading during grinding

| Components | Formulation (% by weight) | Formulation (% by weight) |
| --- | --- | --- |
| Pigments(PCNb) | 13-17 | 25-35 |
| Dispersant* weight % on pigment | 0% | 5-24% |
| Synergist** | 0% | 1.25-3% |
| Solvent/1-propanol | Balance to 100% | Balance to 100% |

*(PVP, mw: 8000)
**SS1200 is copper phthalocyaninesulfonic acid

This example describes effect of dispersant and synergist on pigment loading during grinding. A phthalocyanine blue (PCNb) pigment grind formulation is prepared first without dispersant and synergist, but can only be made at pigment concentrations up to 17% (w/w). If we try to exceed this value, the grind becomes too thick and particle size reduction is inefficient. When synergist and dispersant are added to the formulation, grind formulations are thinner, and can be made at least 25 wt % and also obtain improved particle size reduction and produce inks with higher pigment content.

EXAMPLE 4

This example describes effect of dispersant and synergist on pigment loading during grinding

| Formulation | Pigment % | Mean Particle size (um) |
|---|---|---|
| PCNb and 1-propanol only | 25 | 1.3260 |
| PCNb/SS12k/1-propanol | 25 | 1.7393 |
| PCNb/SS12k/PVP/1-propanol | 33 | 0.9859 |
| PCNb/PVP/1-propanol | 25 | 1.2470 |

Base curve portion (male mold halves) of polypropylene molds are pad printed with a combination of three inks (three patterns, one different color per pattern, same ink formulation, different only for type and quantity of pigments). The printed mold is exposed to first high intensity UV (Fusion D bulb) for about 4 second.

Both male mold and female mold are exposed to second high intensity UV (Fusion H+ bulb) for about 1.5 second. There is a 24 hours of time delay between the first high intensity UV treatment and second high intensity UV treatment. The front curve portion (male mold halves) is then filled with about 75 microliters of lens formulation. The mold halves (printed/cured male and filled female) are combined and closed. The molds are then placed under UV lamp (double side) for about 6 minutes at 4-8 mW/cm2. After curing, lenses are demolded, extracted in isopropanol for 1 hour, and then re-equilibrated in Phosphate buffered saline (PBS). Print quality smearing/smudging/delamination) is evaluated at high magnification. Lens with presence of smearing or smudging or delamination are considered not cosmetically acceptable. The resulted lens has an ion permeability of 5.5-6×10-6 mm2/min.

What is claimed is:

1. An ink for making colored silicone hydrogel contact lenses, comprising at least a pigment, a polymeric dispersant, a synergist, a solvent and an actinically or thermally curable silicone-containing binder polymer including ethylenically unsaturated groups and segments derived from at least one silicone-containing vinylic monomer or macromer, wherein the synergist is selected from a group consisting of sulfonated Cu-phthalocyanine, copper phthalocyaninesulfonic acid and combinations thereof, wherein the ink is substantially free of water and has capability to be cured actinically or thermally to form a colored coat on a contact lens, wherein the ink is characterized by having a longer print life using a pad-printing system by at least 30% comparing to the ink which has the same composition except with no polymeric dispersant, wherein ink life is a number of printed parts that can be achieved in a print cycle.

2. The ink of the claim 1, wherein the polymeric dispersant is selected from a group consisting of polyvinylpyrrolidone, alkylamino- functionalized polyethylene oxide and polypropylene oxides, polyoxyethylene alkylether polymers with a phosphate ester functionality, polyacrylic acid, polymer comprising a vinyl monomer containing dialkylamine groups, polymer comprising a vinyl monomer containing a phosphate ester group, and combinations therefore.

3. The ink of the claim 2, wherein the polymeric dispersant is a polyvinylpyrrolidone.

4. The ink of the claim 3, wherein polyvinylpyrrolidone has a weight average molecular weight of 4000 to 20000.

5. The ink of the claim 1, wherein the pigment comprises at least 2.5 percent of organic pigment selected from a group consisting of phthalocyanine blue, phthalocyanine green, carbazole violet and combinations thereof.

6. The ink of the claim 1, wherein the pigment comprises at least 3 percent of organic pigment selected from a group consisting of phthalocyanine blue, phthalocyanine green, carbazole violet and combinations thereof.

7. The ink of the claim 1, wherein the pigment comprises at least 4 percent of organic pigment selected from a group consisting of phthalocyanine blue, phthalocyanine green, carbazole violet and combinations thereof.

8. The ink of the claim 1, wherein the pigment comprises at least 4.5 percent of organic pigment selected from a group consisting of phthalocyanine blue, phthalocyanine green, carbazole violet and combinations thereof.

9. The ink of claim 1, wherein the solvent is one or more organic solvents selected from the group consisting of acetone, methanol, ethanol, propanol, 2-ethoxyethanol, isopropanol, glycols, ketones, esters, cyclopentanone, cyclohexanone, tetrahydrofuran, acetone, methyl-2-pyrrolidone, dimethyl formamide, acetophenone, methylene dichloride, dimethyl sulfoxide, gamma-butyrolactone, ethylene dichloride, isophorone, o-dichlorobenzene, tetrahydrofuran, diacetone alcohol, methyl ethyl ketone, acetone, 2-nitropropane, ethylene glycol monoethyl ether, propylene carbonate, cyclohexanol, chloroform, trichloroethylene, 1,4-dioxane, ethyl acetate, ethylene glycol monobutyl ether, chlorobenzene, nitroethane, ethylene glycol monomethyl ether, butyl acetate, 1-butanol, methyl isobutyl ketone, nitromethane, toluene, ethanol, diethylene glycol, benzene, diethyl ether, ethanolamine, carbon tetrachloride, propylene glycol, hexane, ethylene glycol, and formamide.

10. The ink of claim 1, wherein the binder polymer is an ethylenically functionalized derivative of a silicon-containing polymer having pendant functional groups selected from the group consisting of hydroxyl groups, primary amino groups, secondary amino groups, carboxylic groups, epoxy groups, aldehyde groups, amide groups, acid halide groups, isothiocyanate groups, isocyanate groups, halide groups, acid anhydride groups, and combinations thereof.

11. The ink of claim 10, wherein the silicon-containing polymer is a copolymerization product of a polymerizable composition comprising: (a) at least one hydrophilic vinylic monomer; (b) at least one functionalizing vinylic monomer containing at least one functional group selected from the group consisting of hydroxyl group, primary amino group, secondary amino group, carboxylic group, epoxy group, aldehyde group, amide group, acid halide group, isothiocyanate group, isocyanate group, halide group, acid anhydride group, and combinations thereof; (c) at least one silicone-containing vinylic monomer or macromer; and (d) optionally one or more components selected from the group consisting of a polymerization initiator, a chain transfer agent, and a solvent.

12. The ink of claim 11, wherein the hydrophilic vinylic monomer is hydroxyl-substituted C1-C8 alkyl acrylates, hydroxyl-substituted C1-C8 alkyl methacrylates, acrylamide, methacrylamide, C1-C8 alkyl acrylamides, C1-C8 alkyl methacrylamides, ethoxylated acrylates, ethoxylated methacrylates, hydroxyl-substituted C1-C8 alkyl acrylamides, hydroxyl-substituted C1-C8 alkyl methacrylamides, hydroxyl-substituted C1-C8 alkyl vinyl ethers, sodium vinylsulfonate, sodium styrenesulfonate, 2-acrylamido-2-methylpropanesulfonic acid, N-vinyipyrrole, N-vinyl-2-pyrrolidone, 2-vinyloxazoline, 2-vinyl-4,4'-dialkyloxazolin-5-one, 2- and 4-vinylpyridine, vinylically unsaturated carboxylic acids having a total of 3 to 5 carbon atoms, amino C1-C8-alkyl acrylates wherein the term amino also includes quaternary ammonium, mono C1-C8 alkylamino C1-C8 alkyl acrylates, di(C1-C8 alkyl amino) C1-C8 alkyl acrylates, amino C1-C8 alkyl methacrylates wherein the term amino also includes quaternary ammonium, mono C1-C8 alkyl amino C1-C8 alkyl methacrylates, di(C1-C8 alkyl amino) C1-C8 alkyl methacrylates, or allyl alcohol.

13. The ink of claim 11, wherein the functionaiizing vinytic monomer is methacrylic acid, acrylic acid, glycidylmethacrylate, glycidytacrylate, 2-hydroxyethvl methacrylate 2-hydroxyethyl acrylate, methacrylic anhydride, N-hydroxymethylacrylamide, 2-bromoethylmethacrylate, or vinylbenzylchoride.

14. The ink of claim 1, wherein a ratio wt % polymeric dispersant to wt % synergist is between 2:1 and 20:1.

\* \* \* \* \*